HUGH E. RIORDAN
FRANK SAMET
*INVENTOR.*

BY
*Francis H. Trosselle*
ATTORNEY

HUGH E. RIORDAN
FRANK SAMET
*INVENTORS*

BY

*Francis P. Marcella*

ATTORNEY

United States Patent Office 3,375,722
Patented Apr. 2, 1968

3,375,722
LINEAR AND ANGULAR VELOCITY AND ACCELERATION MEASURING INSTRUMENT
Hugh E. Riordan, Wyckoff, N.J., and Frank Samet, New York, N.Y., assignors to General Precision Inc., Little Falls, N.J., a corporation of Delaware
Filed Jan. 4, 1965, Ser. No. 423,287
11 Claims. (Cl. 74—5.6)

The present invention relates to inertial navigation instruments and more particularly to a single instrument in which the functions of a rate gyro and linear accelerometer are combined.

The dual purpose instrument of the present invention can be described broadly as a rate gyro with an additional degree of freedom about a hinge axis spaced from the spin axis of the rotor which enables the gyro to serve as the proof mass of a linear accelerometer so that the same instrument can measure both linear and angular input rates. By combining the two functions into one instrument, substantial savings in size, weight and cost can be realized as compared to two separate instruments. Further, the instrument can be made to measure the linear and angular inputs in either analog or digital mode merely by changing the type of sensors and associated equipment selected, the mechanical configuration of the instrument remaining substantially unchanged.

Accordingly, it is one object of the invention to provide a single instrument which combines the functions of a rate gyro and a linear accelerometer.

It is another object of the invention to provide a dual purpose instrument of the type described above which can be made to measure the linear and angular inputs in either analog or digital mode without substantially changing the mechanical configuration of the instrument.

It is a further object of the invention to provide a dual purpose instrument of the type described above employing transducers having a frequency output proportional to the linear and angular input rates and wherein the number of cycles counted over a given time interval is proportional to the linear and angular input velocities.

It is a still further object of the invention to provide a dual purpose instrument of the type described above which can measure linear and angular inputs simultaneously acting on the same input axis.

It is a still further object of the invention to provide a dual purpose instrument of the type described above which is simple, effective in use, versatile, and results in substantial savings in size, weight and cost as compared to two separate instruments.

Other objects and features of novelty of the present invention will be specifically pointed out or will otherwise become apparent when referring, for a better understanding of the invention, to the following description taken in conjunction with the accompanying drawings, wherein.

Figure 1:
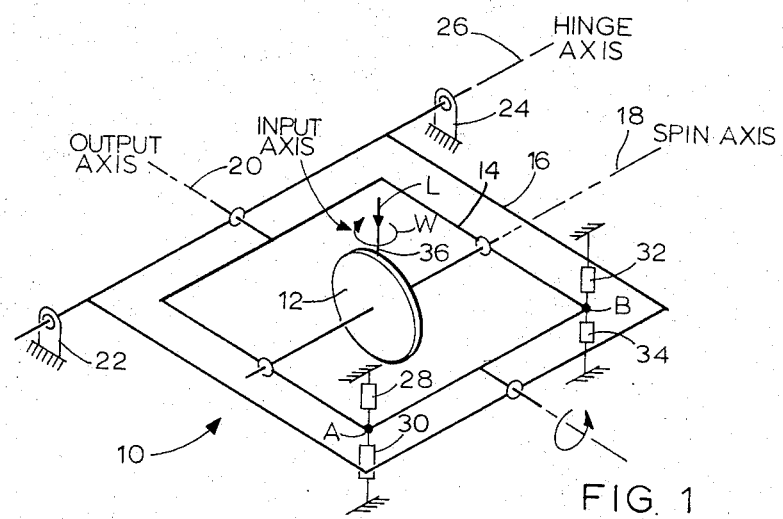
FIG. 1 is a schematic diagram of a dual purpose inertial navigational instrument embodying features of the invention.

Referring to FIG. 1, an instrument 10 is shown which illustrates one embodiment of the invention. It comprises a rotor 12 rotatably mounted within a gimbal 14 for rotation about a spin axis 18. The gimbal 14 is rotatably mounted in a gimbal 16 with the spin axis 18 of the rotor perpendicular to the axis of rotation of the gimbal 14 which is the output axis 20 of the instrument. The gimbal 16 is pivotally connected to the frame of the instrument by hinge supports 22 and 24 for pivotal movement about a hinge axis 26.

Sensors 28 and 30 are mounted between a corner A of the gimbal 14 and the frame of the instrument, and sensors 32 and 34 are mounted between a corner B of the gimbal 14 and the frame of the instrument to sense and restrain movement of the gimbal at each corner. With this construction, the rotor 12 and gimbal 14 precess about the output axis 20 (subject to the restraint provided by the sensors) in response to angular inputs about an input axis 36 to provide the gyro function of the instrument, and the rotor and gimbal also act as an inert proof mass for linear inputs along the input axis 36. The sensors 28–34 restrain the gimbal 14 against precession in response to angular inputs and against pivotal movement about the hinge axis 26 in response to linear inputs along the input axis 36.

Figure 2:
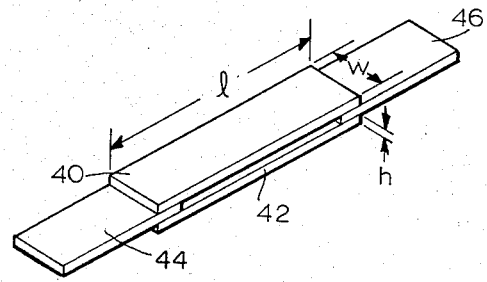
FIG. 2 is a perspective view of a vibrating beam transducer which can be used in the instrument of FIG. 1.
Figure 3:
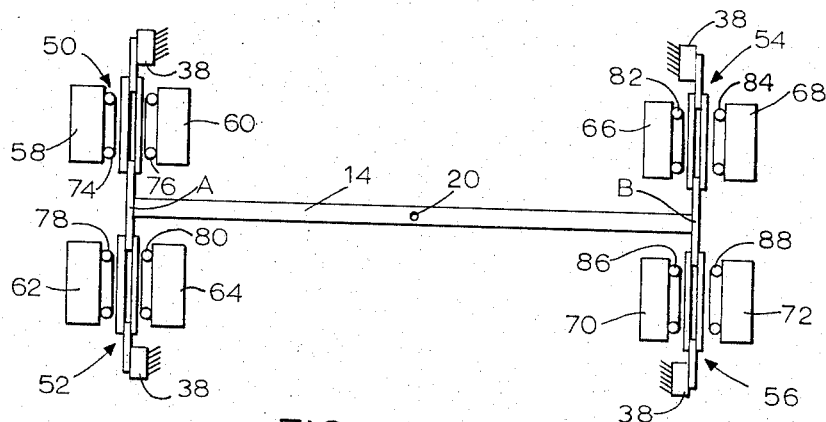
FIG. 3 is a side view of a gimbal of the instrument of FIG. 1 with four vibrating beam transducers of the type illustrated in FIG. 2 employed as sensors.

If a frequency or digital output is desired for the instrument 10, a number of different types of vibrating transducers can be employed as the sensors 28–34. For example, pre-tensioned strings can be employed and vibrated as disclosed in the patent to Appleton 3,098,388 issued on July 23, 1963, or vibrating beam transducers which can be placed under tension and compression can be employed as disclosed in the copending applications of John C. Stiles and Hamilton Southworth, Jr., Serial No. 236,107, filed on Nov. 11, 1962, and now U.S. Patent No. 3,269,692 and of Hugh E. Riordan, Serial No. 423,148, filed on even date, both assigned to the assignee of the present application. A vibrating beam transducer of the type disclosed in the latter copending application is illustrated in FIG. 2 and four of these transducers 50–56 are illustrated in FIG. 3 in position to act as the sensors of FIG. 1.

The operation of the instrument 10 of FIG. 1 will now be described with the vibrating beam transducers 50–56 serving as the sensors 28–34, respectively. In response to a linear input L (FIG. 1) acting along the input axis 36 as indicated by the arrow, the vibrating beam transducers 50 and 54 will be placed under tension and the vibrating beam transducers 52 and 56 will be placed under compression. Of course, if the input L is acting in the opposite direction, the reverse would be true, that is the transducers 52 and 56 would be placed under tension and the transducers 50 and 54 placed under compression. The transducers are each vibrated at their natural frequencies to produce frequency outputs as will be described in greater detail hereinafter. The natural frequency of vibration of each of the transducers decreases when it is placed under compression in proportion to the compressive force and increases when it is placed under tension in proportion to the tensioning force. Therefore, in response to a downwardly acting input L as illustrated in FIG. 1, the natural frequency of vibration of the transducers 50 and 54 will increase since they are placed under tension and the natural frequency of vibration of the transducers 52 and 56 will decrease since they are placed under compression. If the input L is an acceleration, the magnitude of the acceleration will be proportional to the sum of the difference frequencies of each push-pull pair of transducers as given by the following equation:

(1) $\quad L = K_a [(W_{50} - W_{52}) + (W_{54} - W_{56})]$ where

L is the linear acceleration;
$K_a$ is a constant; and
W is the frequency of vibration of each of the transducers 50–56.

To determine velocity along the input axis 36 instead of acceleration, the vibration cycles of each difference frequency can be counted over a given time interval, instead of the difference frequencies being measured. When the input is an angular input rate about the input axis 36 as indicated by the arrow ω an upwardly directed force is applied at the corner B of the gimbal 14 and a downwardly directed force at the corner A of the gimbal. Of course if the angular input rate were reversed, the direction of the forces at the corners A and B of the gimbal also would be reversed. Therefore in the presence of the angular input ω as shown, the transducers 50 and 56 are placed under tension and the transducers 52 and 54 are placed under compression. The following equation applies for determining ω:

(2) $\quad \omega = K_w[(W_{50}-W_{52})-(W_{54}-W_{56})]$

A comparison of Equations 1 and 2 shows that while linear acceleration is proportional to the sum of the two difference frequencies, an angular rate input is proportional to the difference of the two difference frequencies. As before, angular velocity can be obtained by counting the difference frequencies over a given time interval.

In the case of simultaneous angular and linear inputs about and along the input axis 36, the resulting difference frequencies ($W_{50}-W_{52}$) and ($W_{54}-W_{56}$) can be successively added and subtracted to separate and measure the two different inputs. If analog outputs are desired, bi-polar pickoffs are employed as the sensors 28 and 32 and bi-polar torquers as the sensors 30 and 34. The pickoffs, of course, detect movement at the corners A and B and control the torquers at the corners to restrain this movement. The sum of the torquer currents for each torquer is proportional to the linear input acceleration and the difference is proportional to the angular input rate. If linear and angular input rates are experienced simultaneously along and about the input axis 36. The torquer outputs can be successively added and subtracted to separate and measure the linear and angular inputs.

It is also possible to operate the instrument 10 with a single sensor connected to the corner A of the gimbal 14 and a single sensor connected to the corner B. For example, the sensors 30 and 34 could be eliminated and vibrating beam transducers used as the sensors 28 and 32. In this case, the difference of the frequencies of the two transducers will be proportional to the angular input rate ω and the sum of the frequencies of the two transducers would be proportional to the linear acceleration if it is applied alone without an angular input rate being applied simultaneously. If an angular input rate ω and a linear acceleration L are simultaneously applied to the input axis 36, the frequency output of each of the transducers would have to be compared to a standard frequency so as to provide a first frequency output equal to the difference between the frequency of one of the transducers and the standard frequency, and a second frequency output equal to the difference between the frequency of the other of the transducers and a standard frequency. These first and second frequency outputs could then be successively added and subtracted to separate and measure the linear and angular inputs, respectively.

Referring to FIG. 2, a vibrating beam transducer 40 of the type disclosed in the aforementioned copending application of Hugh E. Riordan is illustrated and will now be described in detail. It comprises parallel spaced apart beams 40 and 42 cemented to end supports 44 and 46. The vibrating beam transducer is mounted on the instrument by cementing the end support 44 to the gimbal 14 and the end support 46 to the frame 38 as illustrated in FIG. 3. As previously described, four of these vibrating beam transducers 50–56 can be employed as illustrated in FIG. 3. The vibrating beam transducers 50 and 52 are connected between the frame 38 and the corner A of the gimbal 14 as were the sensors 28 and 30 (FIG. 1), and the vibrating beam transducers 54 and 56 are connected between the frame 38 and the corner B of the gimbal 14 as were the sensors 32 and 34. The vibrating beam transducers can be vibrated by several different techniques disclosed in the copending Riordan application. In accordance with one of these techniques, the beams 40 and 42 of each of the transducers 50–56 are made of a very thin magnetic permeable material so that they can be vibrated at their natural frequencies by solenoids 58–72 energized by an AC voltage. In this embodiment, the beams 40 and 42 each have a length $l$ of ¼-inch, a width $w$ of 1/16-inch and a thickness $h$ of .003 inch, the dimensions $l$, $w$ and $h$ being indicated in FIG. 2. The solenoids 58 and 60 are positioned on opposite sides of the vibrating beam transducer 50 and the solenoids 62 and 64 are positioned on opposite sides of the vibrating beam transducer 52. A pair of interconnected pickup coils 74 and 76 are positioned in the air gaps between the vibrating beam transducer 50 and the solenoids 58 and 60, and a similar pair of interconnected pickup coils 78 and 80 are positioned in the air gaps between the vibrating beam transducer 52 and the solenoids 62 and 64. With this arrangement, each of the pickup coils will have a voltage induced therein having the same frequency as that of the vibrating beam adjacent thereto. Interconnected pickup coils 82 and 84 are associated with the solenoids 66 and 68 and interconnected pickup coils 86 and 88 are associated with the solenoids 70 and 72 in a similar manner.

The vibrating beam transducers have sufficient stiffness to restrain precession of the gimbal 14 about the output axis 20 and also to restrain pivotal movement of the gimbal 14 about the hinge axis 26 (FIG. 1). If desired, the angular movement of the gimbal 14 can be limited to a few microradians. When the gimbal precesses in a clockwise direction as viewed in FIG. 3, the vibrating beam transducers 50 and 56 are placed under compression, and the transducers 52 and 54 under tension. When the gimbal 14 precesses in a counter-clockwise direction, the transducers 52 and 54 are placed under compression and the transducers 50 and 56 under tension. In response to a downward acceleration force L acting along the input axis 36 (FIG. 1), the transducers 52 and 56 are placed under compression and the transducers 50 and 54 are placed under tension, and in response to an upwardly directed acceleration, the transducers 50 and 54 are placed under compression and the transducers 52 and 56 are placed under tension.

Figure 4:
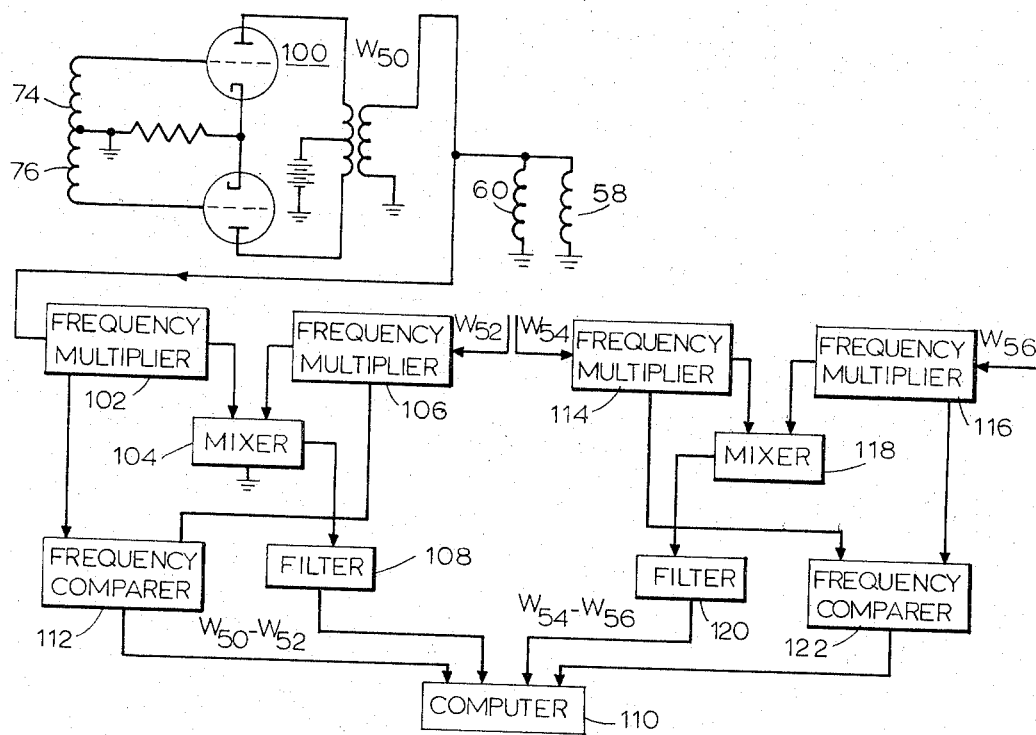
FIG. 4 is a schematic diagram of a circuit which can be used in connection with the vibrating beam transducers of FIG. 3.

The beams 40 and 42 of each of the vibrating beam transducers are vibrated at their natural frequency by the solenoid associated therewith. The natural frequency of vibration of the beams decreases in proportion to a compressive force applied thereto and increases in proportion to a tensioning force, and this change in natural frequency is utilized to produce a frequency or digital output proportional to an angular input rate about the input axis 36 and/or a linear acceleration along the input axis 36. A specific circuit for accomplishing this is illustrated in FIG. 4. The AC voltage induced in the pickup coils 74 and 76 is amplified by an amplifier 100 and applied to the solenoids 58 and 60 to sustain the vibration of the beams 40 and 42 of the vibrating beam transducer 50 at its natural frequency. The amplified voltage having a frequency $W_{50}$ which is the same frequency as that of the vibrating beam transducer 50 is applied to a frequency multiplier 102 and then to a mixer 104. An identical feedback circuit (not shown) is provided to sustain the vibration of the beams of the vibrating beam transducer 52 and an amplified voltage having a frequency $W_{52}$ which is the same frequency as that of the vibrating beam transducer 52 is applied to a frequency multiplier 106 and then to the mixer 104 where it is mixed with the frequency $W_{50}$.

The intermodulation of the frequencies $W_{50}$ and $W_{52}$ that occurs in the mixer 104 produces the sum and difference frequencies $W_{50}+W_{52}$ and $W_{50}-W_{52}$. The difference frequency $W_{50}-W_{52}$ is separated by a filter 108 and applied to a computer 110. In order to determine the polarity of the difference frequency $W_{50}-W_{52}$, the signals from the frequency multipliers 102 and 106 are applied to a frequency comparer 112 to determine which of the frequencies $W_{50}$ and $W_{52}$ is greater. The output of the frequency comparer is applied to the computer 110 to indicate that the signal from the filter 108 is positive if the frequency $W_{50}$ is greater than the frequency $W_{52}$ and negative if the frequency $W_{52}$ is greater than the frequency $W_{50}$.

Additional feedback circuits (not shown) are provided to sustain the vibration of the transducers 54 and 56 (FIG. 3), and to provide an amplified voltage having a frequency $W_{54}$ which is the same frequency as that of the vibrating beam transducer 54, and an amplified voltage having a frequency $W_{56}$, which is the same frequency as that of the vibrating beam transducer 56. The amplified voltages $W_{54}$ and $W_{56}$ are applied to frequency multipliers 114 and 116, respectively, and then to a mixer 118 and a filter 120 which filters out the difference frequency $W_{54}-W_{56}$ which is applied to the computer 110. As before, the signals from the frequency multipliers 114 and 116 are applied to a frequency comparer 122 and then to the computer 110 to indicate whether the output of the filter 120 is positive or negative. The computer 110 adds the two difference frequencies applied thereto from the filters 108 and 120 to provide a direct digital indication of the linear input rate along the input axis 36 (FIG. 1), and also subtracts the two difference frequencies to provide a digital representation of the angular acceleration about the input axis 36. In the event that angular and linear inputs are simultaneously applied about and along the input axis 36, the computer 110 successively adds and subtracts the difference frequencies from the filters 108 and 120 to separate and measure the two inputs. To determine velocity along or about the input axis 36 instead of acceleration, the computer merely counts the frequency cycles from each filter over a given time interval instead of measuring them. The sum of the counts then represents the linear velocity and the difference represents the angular velocity.

Figure 5:
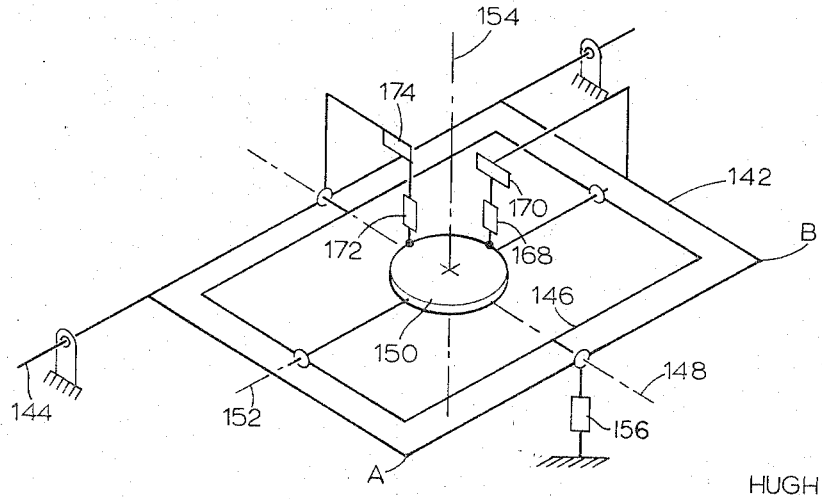
FIG. 5 is a schematic diagram similar to FIG. 1 illustrating another embodiment of the invention.

Referring to FIG. 5, another embodiment of the invention is illustrated in connection with a two degree of freedom gyro. An outer gimbal 142 is pivotally connected to a frame for pivotal movement about a hinge axis 144 as in the embodiment of FIG. 1. A gimbal 146 is rotatably mounted within the gimbal 142 for precession about an output axis 148 perpendicular to the hinge axis 144, and a rotor housing 150 is rotatably mounted within the gimbal 146 for precession about an output axis 152 perpendicular to the output axis 148 and parallel to the hinge axis 144. The spin axis 154 of the rotor within the rotor housing 150 is perpendicular to the output axes 148 and 152. A first vibrating beam transducer 156 of the type illustrated in FIGS. 2 and 3 is connected between the gimbal 142 and the gyro frame to restrain pivotal movement of the gimbal about the hinge axis 144. The vibrating beam transducer 156 is parallel to the spin axis 154 and connected to the gimbal 142 at a point lying on the output axis 148. A second vibrating beam transducer 168 is connected between the rotor housing 150 and a member 170 rigidly connected to the gimbal 142 to restrain precession of the rotor housing 150 about the output axis 148. A third vibrating beam transducer 172 is connected between the rotor housing 150 and a member 174 rigidly connected to the gimbal 142 to restrain precession of the rotor housing 150 about the output axis 152. The transducers 168 and 172 also are both parallel to the spin axis 154 and connected to the rotor housing at points lying on the output axes 152 and 148, respectively.

With this construction, the vibrating beam transducer 156 will be placed under compression or tension in response to linear inputs in one direction or the other along the spin axis 154 and the natural frequency of vibration thereof will increase or decrease, as previously described. Suitable circuitry can be provided for producing a frequency output or a digital output from the transducer 156 proportional to the linear input along the spin axis 154. The vibrating beam transducer 168 will be compressed or tensioned in response to precession in one direction or the other about the output axis 148 caused by angular inputs about the axis 152. Changes in the natural frequency of vibration of the transducer 168 will be proportional to the angular inputs about the axis 152 and suitable circuitry can be provided to produce a frequency or digital output proportional to the angular input. Similarly, the vibrating beam transducer 172 will be placed under compression or tension in response to precession of the rotor housing 150 about the output axis 152 caused by angular inputs about the axis 148 and changes in the natural frequency of vibration of the vibrating beam transducer 172 can be utilized to provide an indication of the angular inputs about the axis 148.

If desired, an additional vibrating beam transducer can be connected to the gimbal 142 in push-pull relationship with the vibrating beam transducer 156 similar to the manner in which the vibrating beam transducers 50 and 52 are connected in push-pull relationship in FIG. 3. The linear output along the spin axis 154 would then be taken as the difference frequency of these two transducers. Similarly, a vibrating beam transducer can be connected to the rotor housing 150 in push-pull relationship with the vibrating beam transducer 168 and another vibrating beam transducer connected in push-pull relationship with the vibrating beam transducer 172. The angular inputs about the axis 152 would then be taken as the difference frequency of the pair of vibrating beam transducers including the vibrating beam transducer 168, and the angular inputs about the axis 148 would be taken as the difference frequency of the pair of vibrating beam transducers including the vibrating beam transducer 172. Of course, the vibrating beam transducers could be located in different positions and still perform their necessary functions, and additional vibrating beam transducers could be provided to assist the other transducers. For example, the vibrating beam transducer 156 could be replaced by two pairs of vibrating beam transducers acting in push-pull relationship at the corners A and B of the gimbal 42 similar to the embodiment of FIG. 1. Reference is made to the aforementioned copending application of Hugh E. Riordan for additional examples of how the vibrating beam transducers can be employed to restrain precession of the rotor housing 150.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. An instrument for measuring linear and angular inputs along and about the same input axis comprising a first gimbal, a second gimbal rotably supported by said first gimbal for rotation about a precession axis, a rotor rotatably supported by said second gimbal for rotation about a spin axis perpendicular to said precession axis, means for pivotally supporting said first gimbal for pivotal movement about a hinge axis extending through said precession axis in parallel spaced apart relation to said spin axis, said precession axis constituting the output axis of said instrument with the input axis thereof being orthogonally related to said spin axis and output axis, and sensor means connected to first and second points on said second gimbal for restraining angular movement of the second gimbal and producing an output proportional to angular and linear inputs about and along said input axis, said first and second points defining a line extending through said output axis in parallel spaced apart relation to said hinge axis and said spaced points being substantially equidistant from said output axis.

2. The instrument as defined in claim 1 wherein said spaced points are disposed on one side of said spin axis and said hinge axis on the other side thereof.

3. The instrument as defined in claim 1 wherein said sensor means comprises vibrating force transducer means having an output frequency proportional to the force exerted thereon by angular movement of said second gimbal.

4. The instrument as defined in claim 1 additionally comprising an instrument frame and wherein said sensor means comprises a first pair of vibrating force transducer means connected in push-pull relationship between the frame of said instrument and said second gimbal at said first point, and a second pair of vibrating force transducer means connected in push-pull relationship between the instrument frame and said second gimbal at said second point, the sum of the difference frequencies of each of said pairs of transducer means being proportional to linear inputs along said input axis and the difference between said difference frequencies being proportional to angular input rates about said input axis.

5. The instrument as defined in claim 4 wherein each of said vibrating force transducer means comprises a vibrating beam transducer having a natural frequency of vibration which decreases when the transducer is placed under compression and increases when the transducer is placed under tension, and including means for vibrating said vibrating beam transducers at their natural frequencies and producing an output proportional to the sum of the difference frequencies of each pair of vibrating beam transducers and an output proportional to the difference of said difference frequencies.

6. The invention as defined in claim 5 wherein said spaced points are disposed on one side of said spin axis and said hinge axis on the other side of said spin axis.

7. An instrument for measuring linear and angular inputs comprising a rotor having a spin axis gimbal means for rotatably supporting said rotor, an output axis perpendicular to said spin axis and means for supporting said gimbal means for precession about said output axis, a hinge axis spaced from said spin axis and means for pivotally supporting said gimbal means of said instrument for pivotal movement about said hinge axis, and sensor means for restraining precession of said rotor and angular movement of said gimbal means about said hinge axis and measuring the force intensity of angular inputs causing precession of said rotor and linear inputs causing pivotal movement of said gimbal means.

8. The invention as defined in claim 7 wherein said hinge axis passes through said output axis in parallel spaced apart relation to said spin axis so as to define an input axis orthogonally related to said spin and output axes, said sensor means measuring linear and angular inputs along and about said input axis.

9. The invention as defined in claim 8 including circuit means connected to said sensor means for measuring linear and angular inputs simultaneously applied along and about said input axis.

10. An instrument for measuring linear and angular inputs comprising a pendulous linear accelerometer having a rate gyro for a proof mass, the hinge axis of the pendulum being spaced from the intersection of the gyro spin and output axes, and sensor means for sensing the force intensity and restraining pivotal movement of said rate gyro about said hinge axis.

11. An instrument for measuring linear and angular inputs comprising a gyro, means for supporting said gyro on said instrument for movement relative thereto in response to a linear input, and sensor means for sensing the force intensity and restraining the movement of said gyro relative to said instrument and producing an output proportional to the linear input to the instrument.

References Cited

UNITED STATES PATENTS

| 3,190,129 | 6/1965 | Kritz et al. | 73—517 |
| 3,270,566 | 9/1966 | Cenitch et al. | 74—5.6 |
| 3,277,840 | 10/1966 | Li. | |

FRED C. MATTERN, Jr., *Primary Examiner.*

J. D. PUFFER, C. J. HUSAR, *Assistant Examiners.*